US008793592B2

(12) United States Patent
Kunori

(10) Patent No.: US 8,793,592 B2

(45) Date of Patent: Jul. 29, 2014

(54) INFORMATION PROCESSING APPARATUS, METHOD FOR CONTROLLING INFORMATION PROCESSING APPARATUS, AND STORAGE MEDIUM

(75) Inventor: Shiro Kunori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 13/103,419

(22) Filed: May 9, 2011

(65) Prior Publication Data

US 2011/0276916 A1 Nov. 10, 2011

(30) Foreign Application Priority Data

May 10, 2010 (JP) ................................ 2010-108280

(51) Int. Cl.

| | |
|---|---|
| ***G06F 3/02*** | (2006.01) |
| ***G06F 3/00*** | (2006.01) |
| ***G06F 3/048*** | (2013.01) |
| ***G06F 3/0488*** | (2013.01) |

(52) U.S. Cl.

CPC .......... *G06F 3/0227* (2013.01); *G06F 3/04886* (2013.01)

USPC ............ 715/753; 715/757; 715/758; 345/168

(58) Field of Classification Search

CPC ..................................................... G06F 1/1615

USPC .......................................... 715/737, 767, 773

See application file for complete search history.

(56) References Cited

U.S. PATENT DOCUMENTS

| | | | | |
|---|---|---|---|---|
| 5,457,454 | A * | 10/1995 | Sugano | 341/22 |
| 6,523,073 | B1 * | 2/2003 | Kammer et al. | 710/48 |
| 6,542,090 | B1 * | 4/2003 | Tadano et al. | 341/20 |
| 7,546,536 | B2 * | 6/2009 | Imanishi | 715/753 |
| 7,921,361 | B2 * | 4/2011 | Gunn et al. | 715/256 |
| 8,312,032 | B2 * | 11/2012 | Choi et al. | 707/758 |
| 8,413,069 | B2 * | 4/2013 | Blair et al. | 715/783 |
| 2001/0039594 | A1 * | 11/2001 | Park et al. | 709/311 |
| 2002/0054120 | A1 * | 5/2002 | Kawano et al. | 345/773 |
| 2003/0035007 | A1 * | 2/2003 | Wugofski | 345/764 |

(Continued)

FOREIGN PATENT DOCUMENTS

| | | |
|---|---|---|
| JP | 2001-209475 A | 8/2001 |
| JP | 2005-293407 A | 10/2005 |
| JP | 2007-172071 A | 7/2007 |
| JP | 2011-118584 A | 6/2011 |

OTHER PUBLICATIONS

Muneyuki Iwata, "Access VBA Perfect Master Section 10.4 Text Box" including translation, Oct. 1, 2009.

*Primary Examiner* — William Titcomb

(74) *Attorney, Agent, or Firm* — Canon USA Inc. IP Division

(57) ABSTRACT

The present invention enables a user to perform an operation of closing a software keyboard displayed on a display unit by an operation to a predetermined input item with use of a hardware keyboard. A method for controlling an information processing apparatus includes receiving an input to a predetermined input item via a software keyboard displayed on a display unit, receiving an input to the predetermined input item via a hardware keyboard connected to the information processing apparatus, inputting a character to the predetermined input item according to the key input received via the software keyboard or the hardware keyboard, and closing a display of the software keyboard displayed on the display unit if the input to the predetermined input item which is received via the hardware keyboard satisfies a predetermined condition during the display of the software keyboard.

6 Claims, 13 Drawing Sheets

(56) References Cited

U.S. PATENT DOCUMENTS

| | | | | |
|---|---|---|---|---|
| 2004/0064498 | A1* | 4/2004 | Imanishi | 709/201 |
| 2006/0080598 | A1* | 4/2006 | Bargeron et al. | 715/512 |
| 2007/0061753 | A1* | 3/2007 | Ng et al. | 715/816 |
| 2008/0048986 | A1* | 2/2008 | Khoo | 345/168 |
| 2008/0177920 | A1* | 7/2008 | Dennis | 710/200 |
| 2010/0088627 | A1* | 4/2010 | Enkerud et al. | 715/777 |
| 2010/0268924 | A1* | 10/2010 | Fujii | 713/1 |
| 2011/0239150 | A1* | 9/2011 | Liao | 715/773 |

* cited by examiner

FIG.3

| | TITLE | MAXIMUM NUMBER OF ENTERABLE CHARACTERS | MAXIMUM NUMBER OF ENTERABLE LINES | KEYBOARD TYPE |
|---|---|---|---|---|
| SUBJECT | SUBJECT (MAX 128 CHARACTERS) | 128 | 1 | TWO-BYTE KEYBOARD |
| TEXT | TEXT (MAX 256 CHARACTERS) | 256 | 4 | TWO-BYTE KEYBOARD |
| ADDRESS | ADDRESS | 32 | 1 | ONE-BYTE KEYBOARD |
| PASSWORD | PASSWORD | 32 | 1 | PASSWORD KEYBOARD |

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention generally relates to information processing and, more particularly, to an information processing apparatus, a method for controlling an information processing apparatus, and a storage medium.

2. Description of the Related Art

Conventional information processing apparatuses offer, as a method for enabling a user to input a character thereto, the method of displaying a software keyboard (hereinafter also referred to as "soft keyboard") on a display unit equipped with a touch panel to allow a user to input a character by pressing a soft key on the soft keyboard.

Another method for character input is connecting a hardware keyboard (hereinafter also referred to as "hard keyboard") to an information processing apparatus and pressing a hard key on the hard keyboard to input a character.

For example, when a user wants to input a long character string in a predetermined input item in order for processing to be performed by an information processing apparatus, the user may prefer to input the characters with using a hard keyboard which can realize a fast input of characters.

In this case, the user first specifies an input item displayed on a display unit. When the user specifies the input item, the information processing apparatus is set in an input mode, and displays a soft keyboard on the display unit. In this state, the user inputs characters from a hardware keyboard if any hardware keyboard is connected to the information processing apparatus.

As a conventional technique for converting an input from a hard keyboard into an input on a soft keyboard, there is known the invention discussed in Japanese Patent Application Laid-Open No. 2005-293407.

However, after a user finishes inputting characters with use of the hard keyboard, if the hard keyboard is a general-purpose keyboard, the user cannot easily close a soft keyboard because such a hard keyboard does not have a key for closing the soft keyboard. Closing the soft keyboard is possible by pressing a button displayed on the soft keyboard that is prepared to close the soft keyboard. However, this method requires a user to move his/her hand from the hard keyboard to the soft keyboard to press the button for closing the soft keyboard after the user finishes inputting characters every time the user inputs characters, thereby failing to realize intuitive closing of the soft keyboard.

Therefore, the user cannot carry out a series of operations from character input using the hard keyboard to closing of the soft keyboard after completion of the character input, only from an input from the hard keyboard. In this way, the conventional art has an issue of poor operability.

SUMMARY OF THE INVENTION

According to an aspect of the present invention, an information processing apparatus includes a first receiving unit configured to receive an input to a predetermined input item via a software keyboard displayed on a display unit, a second receiving unit configured to receive an input to the predetermined input item via a hardware keyboard connected to the information processing apparatus, a character inputting unit configured to input a character to the predetermined input item according to a key input received via the software keyboard or the hardware keyboard, and a control unit configured to close a display of the software keyboard displayed on the display unit if the input to the predetermined input item which is received via the hardware keyboard satisfies a predetermined condition during the display of the software keyboard.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of parameters for calling a soft keyboard.

DESCRIPTION OF THE EMBODIMENTS

Various exemplary embodiments, features, and aspects of the invention will be described in detail below with reference to the drawings.

Exemplary embodiments of the present invention will be described based on an image forming apparatus which is an example of an information processing apparatus.

<Configuration of Image Forming Apparatus>

Figure 1:
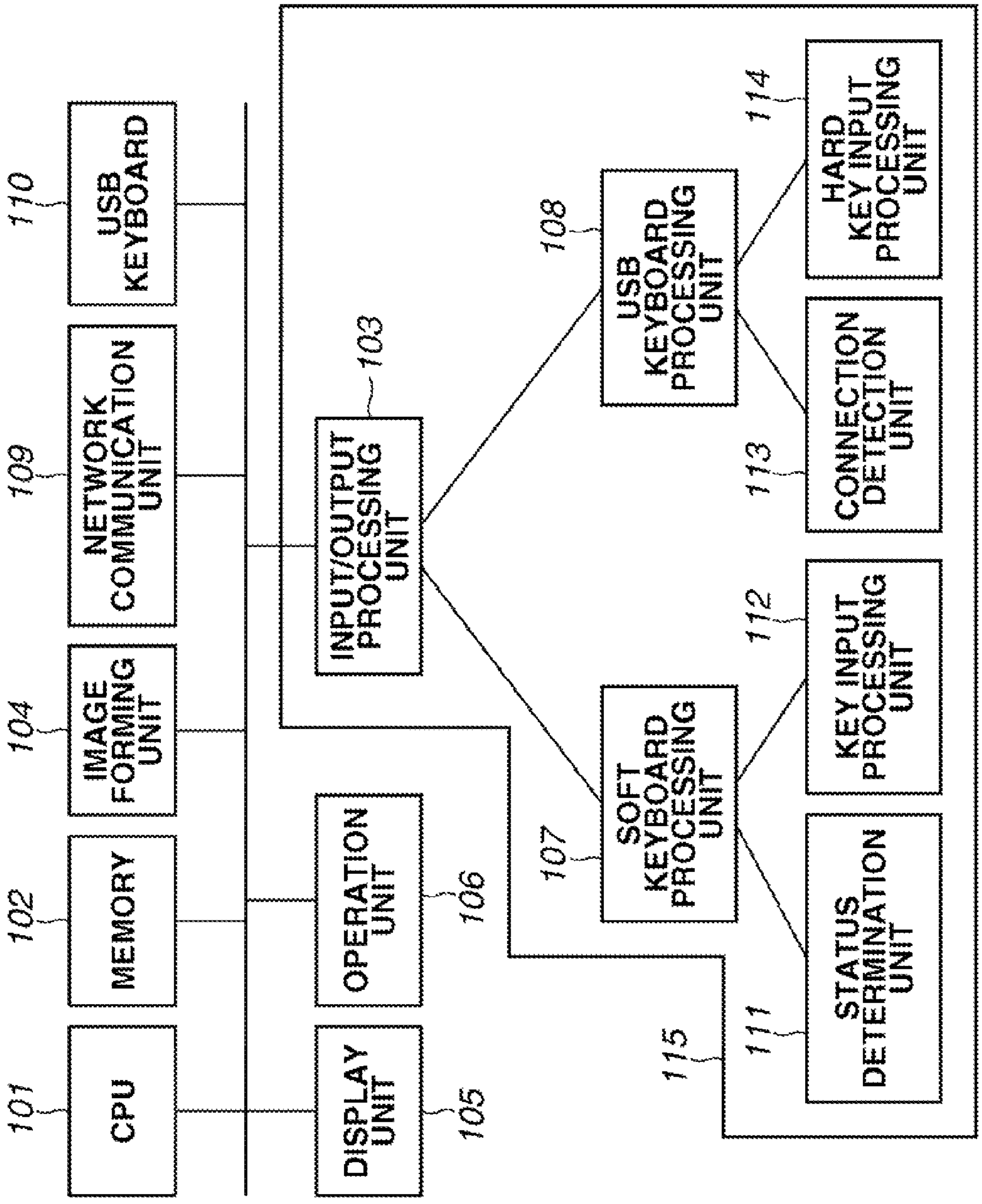
FIG. 1 is a block diagram illustrating a configuration of an image forming apparatus.

FIG. 1 is a block diagram illustrating a configuration of an image forming apparatus according to a first exemplary embodiment of the present invention.

Referring to FIG. 1, a central processing unit (CPU) 101 executes control programs stored in a memory 102 to realize various types of input processing, output processing, and predetermined processing, and make determinations. The memory 102 stores, for example, the control programs read by the CPU 101, various settings, and font information on screens. Procedures illustrated in flowcharts that will be described below are all stored in the memory 102 and is performed by the CPU 101. The memory 102 is constituted by, for example, a read only memory (ROM), a random access memory (RAM), a video random access memory (VRAM), a hard disk drive (HDD), or any combination thereof, but is herein referred to as "memory 102" for convenience of description.

An input/output processing unit 103 exchanges various types of information with an input apparatus, such as a software keyboard and a USB keyboard 110, and an output apparatus such as a display unit 105. Hereinafter, the software keyboard is also referred to as "soft keyboard". Further, hereinafter, the USB keyboard 110 is also referred to as "hardware keyboard". A soft keyboard screen including the soft keyboard is displayed on the display unit 105. The display unit 105 is integrally constructed with a touch panel (operation unit 106). The CPU 101 recognizes a key corresponding to a position pressed through the touch panel, from keys included in the soft keyboard screen displayed on the display unit 105, as a key to which a user instructs an input. The content that the user inputs through the soft keyboard or the USB keyboard 110 is displayed on the display unit 105 so that the user can visibly check it.

An image forming unit 104 compresses and expands image data. The image forming unit 104 includes a sheet feeding unit, a printing unit, and a sheet discharge unit, so that the image forming unit 104 applies printing based on the image data onto a sheet fed by the sheet feeding unit according to an instruction form the CPU 101, and discharges the printed sheet to the sheet discharge unit. The operation unit 106 is the touch panel constructed integrally with the display unit 105. Further, the operation unit 106 may have hard keys constructed integrally with the image forming apparatus, in addition to the touch panel. The operation unit 106 receives an input from a user.

A network communication unit 109 receives image data or a command such as a print instruction via a network, and transmits image data and a command to an external apparatus via the network. A program memory unit 115 is constituted by a nonvolatile memory medium such as a hard disk, and stores the control programs for causing the CPU 101 to perform a plurality of types of operations.

Examples of the control programs include a USB keyboard processing unit 108, an input/output processing unit 103, a soft keyboard processing unit 107, a status determination unit 111, a key input processing unit 112, a connection detection unit 113, and a hard key input processing unit 114. In the present exemplary embodiment, these control programs are loaded onto the memory 102 and are executed by the CPU 101. Alternatively, the USB keyboard processing unit 108, the input/output processing unit 103, the soft keyboard processing unit 107, the status determination unit 111, the key input processing unit 112, the connection detection unit 113, and the hard key input processing unit 114 may be each embodied by dedicated hardware.

The input/output processing unit 103 includes the soft keyboard processing unit 107 for controlling the soft keyboard screen displayed on the display unit 105, and the USB keyboard processing unit 108 for controlling the USB keyboard 110 connected to the image forming apparatus. The soft keyboard processing unit 107 includes the status determination unit 111 which determines the status of the soft keyboard screen, and the key input processing unit 112 which processes an input to a soft key.

The USB keyboard processing unit 108 includes the connection detection unit 113 which detects whether the USB keyboard 110 is connected, and the hard key input processing unit 114 which processes an input to a hard key. In the present exemplary embodiment, the USB keyboard is described as a specific example of the hard keyboard (hereinafter referred to as "keyboard") which is detachably attached to the image forming apparatus, but the hard keyboard may be embodied by another type of keyboard that is not a USB keyboard. Further, the USB keyboard 110 may be configured to be connected to the image forming apparatus through a wired connection, or may be configured to be connected to the image forming apparatus through a wireless connection.

FIG. 1 illustrates a multifunction peripheral provided with the image forming unit for printing data on a sheet and the network communication unit as an example of the image forming apparatus. However, the image forming apparatus is not limited to this configuration. The image forming apparatus may be embodied by an apparatus provided with only a single function, or may be embodied by a multifunction peripheral provided with an image reading unit in addition to the image forming unit and the network communication unit.

Next, the configuration of the display unit 105 of the image forming apparatus will be described.

<Configuration of Display Unit of Image Forming Apparatus>

Figure 2:
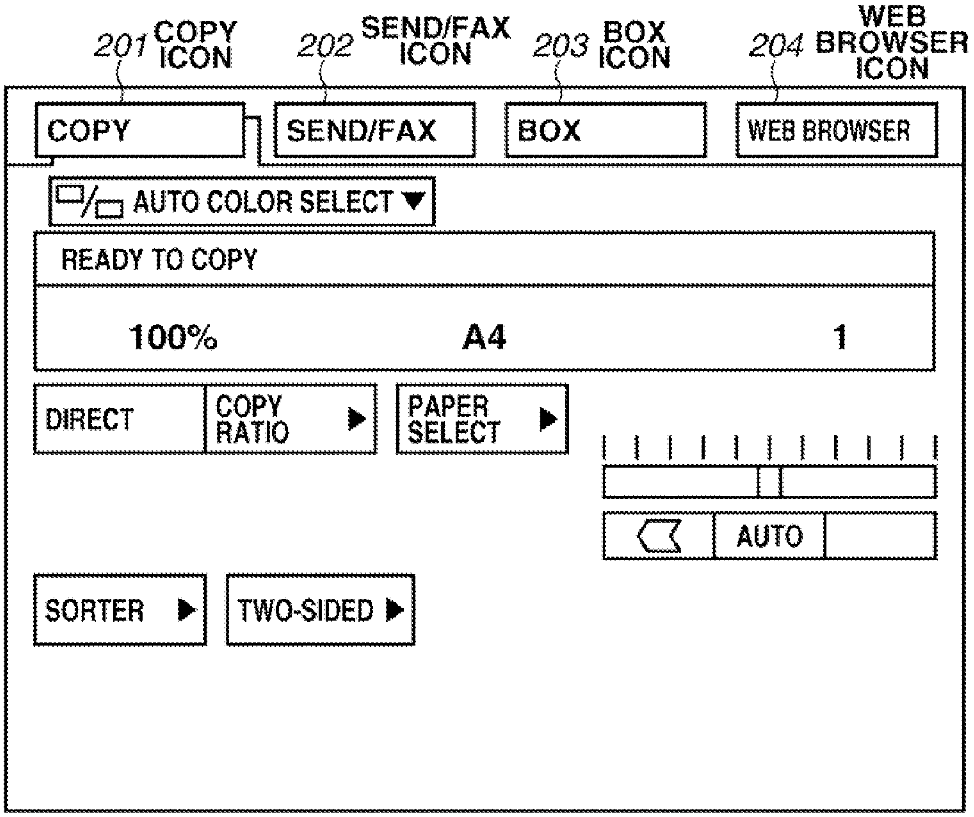
FIG. 2 illustrates an example of a user interface (UI) displayed on a display unit.

FIG. 2 illustrates an example of a user interface displayed on the display unit 105 illustrated in FIG. 1. As described above, the display unit 105 is integrally constructed with the touch panel functioning as the operation unit 106. Therefore, the CPU 101 recognizes the content of user's instruction by detecting, via the touch panel, that the user touches (presses) a position corresponding to an icon (button) indicating each setting item displayed on the display unit 105.

A COPY icon 201 which switches the screen to a setting screen for using a copy function is displayed on the display unit 105 illustrated in FIG. 2. The screen illustrated in FIG. 2 is in such a state that the setting screen for using the copy function is displayed. The setting screen includes keys corresponding to a plurality of setting items for a copy operation. A SEND/FAX icon 202 which switches the screen to a setting screen for using a transmission function or a facsimile function is also displayed on the display unit 105 illustrated in FIG. 2.

Further, a BOX icon 203 which switches the screen to a setting screen for using a box function (function of storing image data into a box) is also displayed on the display unit 105 illustrated in FIG. 2. Furthermore, a WEB BROWSER icon 204 which switches the screen to a screen for using a web browsing function is also displayed on the display unit 105 illustrated in FIG. 2. It should be noted that these icons and keys are just an example, and other keys may be displayed on the display unit 105, such as a system status/cancel icon for switching the screen to a screen for displaying the system status of the image forming apparatus and a job that the CPU 101 is currently processing.

Next, internal processing when a user presses the icon (button) displayed on the display unit 105 will be described.

<Internal Processing at Image Unit>

When the input/output processing unit 103 detects that a user presses a button on the display unit 105, the input/output processing unit 103 detects a coordinate of a position pressed by the user (i.e. pressed coordinate) and screen information indicating which screen is currently displayed on the display unit 105. Then, the input/output processing unit 103 calls and performs the corresponding processing from a correspondence table of "processing corresponding to displayed screens and pressed coordinates" stored in advance in the memory 102. The internal processing when a user presses an item for calling the soft keyboard will be described below.

If execution of the above-described processing by the input/output processing unit 103 necessitates a change in the display content of the display unit 105, the CPU 101 generates display image data to be displayed on the display unit 105 based on information in the memory 102. Then, the input/output processing unit 103 changes the display content by transferring the generated display image data to the VRAM of the memory 102.

The internal processing and the image display processing in response to pressing of the button are performed in all of the following descriptions as common processing, and therefore will be omitted in the following descriptions. In addition, unless otherwise indicated, the CPU 101 is in charge of execution of processing and making determinations, and setting values, results of processing execution, and the system status are stored in the memory 102 in the following descriptions.

Next, the soft keyboard screen displayed on the display unit 105 (the screen showing the soft keyboard) will be described.

<Soft Keyboard Screen>

There is a plurality of types of soft keyboard screens, and a displayed one of these types is determined by a parameter at the time of display of the soft keyboard screen. The parameters are stored in the memory 102 in such a manner that they are associated with items for calling soft keyboards (hereinafter referred to as "calling items"), as FIG. 3 illustrates an example thereof.

When a user presses a calling item displayed on the display unit 105, the input/output processing unit 103 detects the pressed coordinate and the currently displayed screen, and calls the corresponding processing from the memory 102. The processing when the calling item is pressed includes calling a parameter stored in the memory 102 so as to be associated with the pressed calling item, and passing the parameter to the soft keyboard processing unit 107.

Upon reception of the parameter, the soft keyboard processing unit 107 displays the soft keyboard screen according to the parameter on the display unit 105. FIG. 3 illustrates a specific example of the parameters. Each line illustrated in FIG. 3 represents a calling item (for example, "SUBJECT"), and each row represents a parameter (for example, "TITLE"). For one calling time, a plurality of parameters is stored in the memory 102 in such a manner that they are associated with the corresponding calling item.

Figures 4A, 4B:
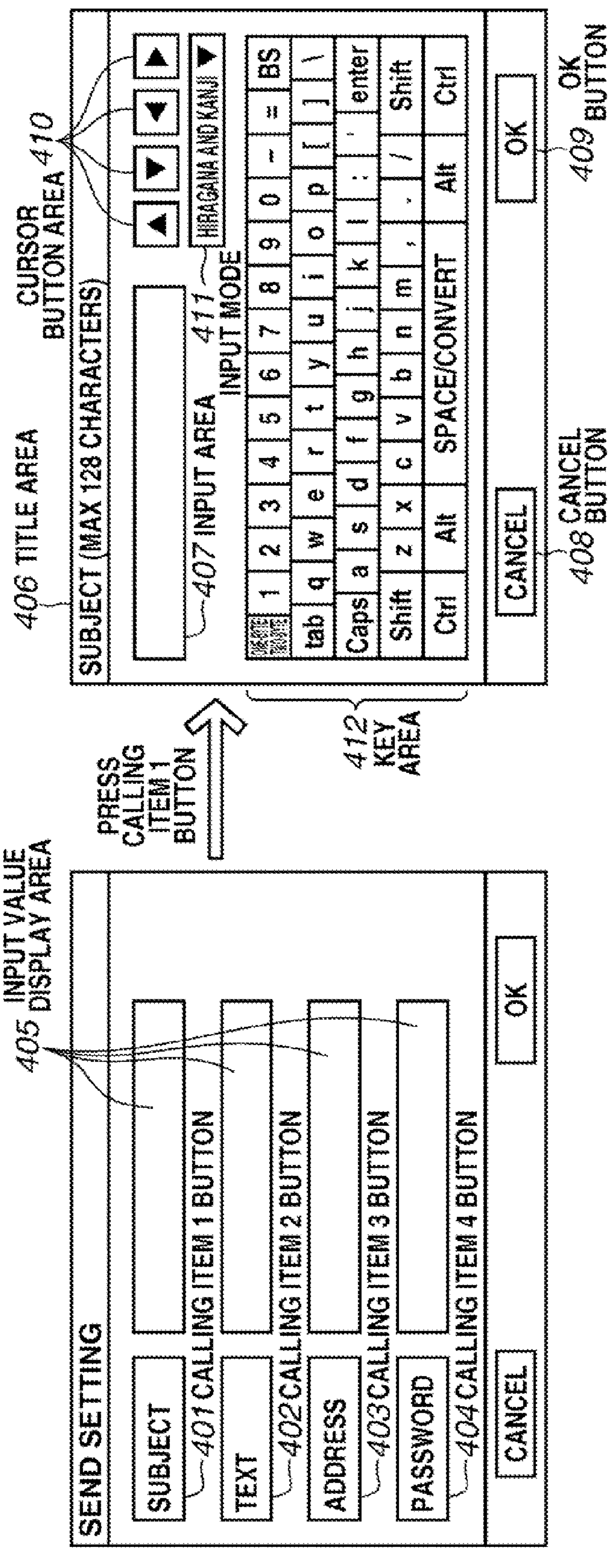
FIGS. 4A and 4B illustrate an example of a UI displayed on the display unit.

FIGS. 4A and 4B illustrate an example of the screen including the calling items and an example of the soft keyboard screen displayed by pressing of the calling item (pressing of a button indicating a calling item).

FIG. 4A illustrates a send setting screen which is displayed when a user presses the SEND/FAX icon 202 illustrated in FIG. 2. The send setting screen includes a plurality of input items used in transmission processing performed by the image forming apparatus. The image forming apparatus receives user's input applied to each of the input items. Further, after the screen illustrated in FIG. 4A is displayed, the soft keyboard screen illustrated in FIG. 4B is displayed on the display unit 105 upon detection of pressing of a button which will be described below.

The soft keyboard screen illustrated in FIG. 4B may be displayed in a manner overlapping the screen illustrated in FIG. 4A or may be displayed by replacing the screen illustrated in FIG. 4A. The screen illustrated in FIG. 4B is a soft keyboard screen displayed when a user presses the calling item "SUBJECT" (calling item 1 button 401) on the screen illustrated in FIG. 4A. The soft keyboard screen is used when a user inputs a subject for transmission of image data from the image forming apparatus via the network communication unit 109.

The soft keyboard screen includes a title area 406 which shows a title indicating contents to be input with the soft keyboard. In this example, the title area 406 shows the "TITLE" information of the parameters illustrated in FIG. 3 without any modification. Therefore, "SUBJECT (MAX 128 CHARACTERS)" is displayed on the screen illustrated in FIG. 4B.

The soft keyboard screen includes an input character display area (abbreviated as "input area") 407, which shows the content that a user inputs. The input character display area 407 shows characters according to the "keyboard type" parameter and an input mode 411. The number of characters that a user can input in the input area 407 is determined by the "maximum number of enterable characters" parameter.

Further, the number of lines that a user can input in the input area 407 is determined by the "MAXIMUM NUMBER OF ENTERABLE LINES" parameter. Further, the soft keyboard screen includes a key area 412 which shows enterable characters and symbols, and a soft key (button) indicating "SHIFT". A combination of the key area 412 and a cursor button area 410 (which will be described below) is referred to as the soft keyboard.

Further, the soft keyboard screen includes a cancel button 408 which a user presses to close the soft keyboard screen (delete the input content and return to the screen showing the calling items).

Still further, the soft keyboard screen includes an OK button 409 which a user presses to close the soft keyboard screen (finalize the input content, and close the soft keyboard to return to the screen showing the calling items).

Still further, the soft keyboard screen includes the cursor button area 410 which displays buttons for moving a cursor (the cursor indicates a position where a user inputs data, but is not illustrated in FIG. 4B) displayed in the input area 407. FIG. 4B also illustrates four buttons, i.e., up, down, left, and right buttons.

Still further, the soft keyboard screen includes an input mode 411. When a user presses this button, the input modes, such as "HIRAGANA AND KANJI", "ALPHABET", "FIXED PHRASE", etc., are displayed as a pull-down list and the user can select the input mode.

The input modes are determined based on the "KEYBOARD TYPE" parameter. The keyboard type "TWO-BYTE KEYBOARD" provides options of all input modes, and a default setting thereof is "HIRAGANA AND KANJI".

The keyboard type "ONE-BYTE KEYBOARD" provides options of "ALPHABET" and "FIXED PHRASE", and a default setting thereof is "ALPHABET".

The keyboard type "PASSWORD KEYBOARD" provides options of "ALPHABET" and "FIXED PHRASE", and a default setting thereof is "ALPHABET". The soft keyboard screen illustrated in FIG. 4B is a soft keyboard screen corresponding to "SUBJECT", and the default setting "HIRAGANA AND KANJI" is displayed as the input mode 411.

When a user wants to input only alphabets, the user selects "ALPHABET". Similarly, when a user wants to input a predetermined fixed phrase, the user selects "FIXED PHRASE". Similarly, when the user wants to input hiragana and kanji characters, the user selects "HIRAGANA AND KANJI" from the pull down list.

Now, the operation in each input mode will be described. The "HIRAGANA AND KANJI" input mode is a mode for writing Japanese words using the commonly-used Roman letter input method. More specifically, when a user inputs an alphabet, the CPU 101 stores the input alphabet into the RAM of the memory 102. Then, the CPU 101 determines whether a hiragana character corresponding to the input alphabet exists in the ROM of the memory 102. If the CPU 101 determines that a hiragana character corresponding to the input alphabet exists in the ROM of the memory 102, the CPU 101 automatically converts the input alphabet into the corresponding hiragana character.

Then, the CPU 101 stores the hiragana character into the RAM of the memory 102 while displaying the hiragana character in the input area 407. On the other hand, if the CPU 101 determines that the hiragana character corresponding to the input alphabet does not exist in the ROM of the memory 102, the CPU 101 stores the input alphabet into the RAM of the memory 102 without any conversion while displaying the stored alphabet in the input area 407.

When a "SPACE/CONVERT" key on the soft keyboard screen is pressed while the hiragana character is displayed, a conversion candidate stored in the ROM of the memory 102 is displayed in the input area 407. Every time the "SPACE/CONVERT" key is pressed, another conversion candidate appears.

When a user wants to finalize the conversion candidate (display a character by its finalized character), the user presses an "ENTER" key. When the user presses the "ENTER" key, the CPU 101 finalizes the conversion candidate, converts the input character stored in the RAM of the memory 102 into the finalized conversion candidate, and displays the finalized conversion candidate on the display unit 105 so that the user can recognize that the conversion candidate is finalized. This is the "HIRAGANA AND KANJI" input mode.

Next, the "ALPHABET" input mode will be described. The "ALPHABET" input mode is a mode for inputting one-byte alphabets (including numbers and symbols). In the "ALPHABET" input mode, when a user inputs an alphabet, the CPU 101 stores the input alphabet into the RAM of the memory 102 without any conversion, and displays the stored alphabet in the input area 407 as a finalized character without any conversion. It should be noted that, when the "KEYBOARD TYPE" parameter is "PASSWORD KEYBOARD", the CPU 101 always replaces a character with the symbol "*" to display it in the input area 407 (for example, when a user inputs "a", the CPU 101 displays "*" in the input area 407). This is the "ALPHABET" input mode.

Next, the "FIXED PHRASE" input mode will be described. The "FIXED PHRASE" input mode is a mode for displaying a fixed phrase which is stored in the memory 102 in advance in the input area 407. If the "FIXED PHRASE" is selected (pressed), the content of a predetermined fixed phrase is displayed in the input area 407 as finalized characters without any conversion. This is the "FIXED PHRASE" input mode.

After a user inputs characters (including symbols, numbers, and a line break) and presses the OK button 409 on the soft keyboard screen configured as described above, the CPU 101 stores the input characters into the RAM of the memory 102 in such a manner that the characters are associated with the calling item, and closes the soft keyboard screen. Then, the CPU 101 displays the character string stored in the RAM of the memory 102 in such a manner that the character string is associated with the calling item in an input value display area 405 corresponding to the calling item.

Figure 5:
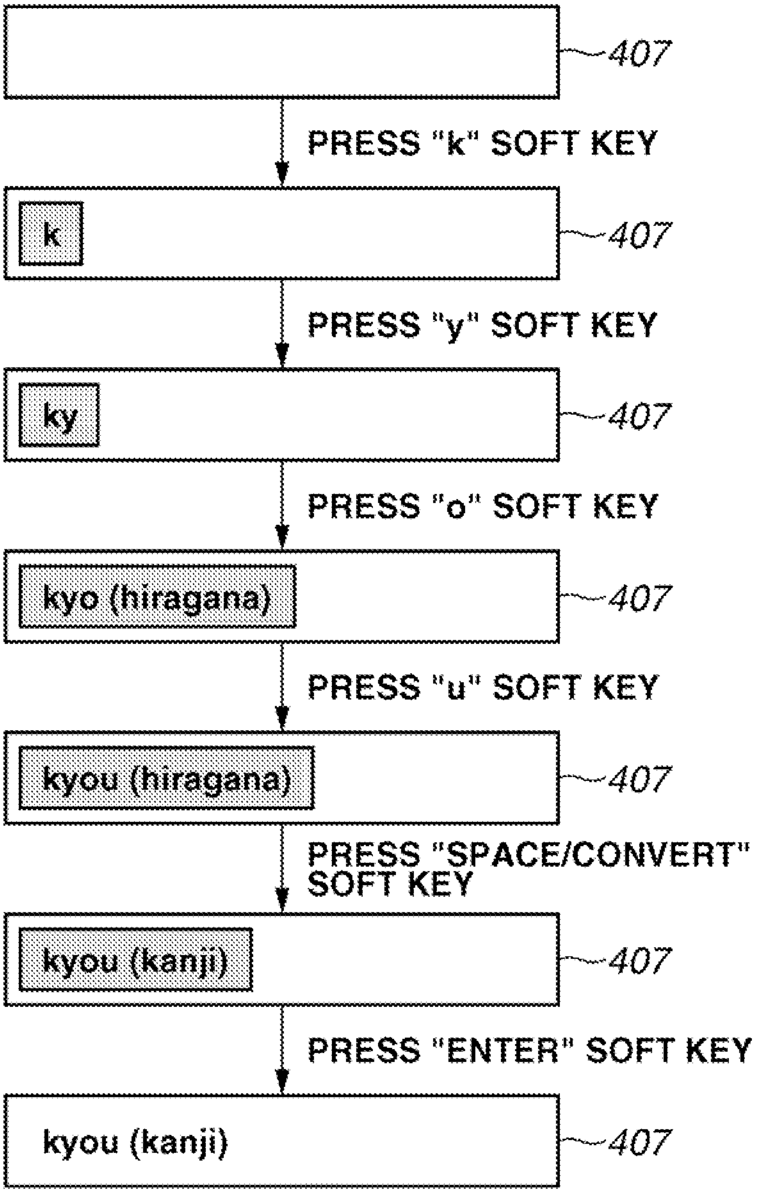
FIG. 5 illustrates states of a character input applied to an input area illustrated in FIG. 4.

Next, a character input on the soft keyboard screen will be described. A case when a user inputs "kyou (kanji)" in the input mode "HIRAGANA AND KANJI" is described as an example with reference to FIG. 5 (FIG. 5 illustrates only the input area 407 on the soft keyboard screen). The user first inputs "kyou" from the soft keyboard as a character input to set the characters "kyou (kanji)" as finalized characters.

Figure 6:
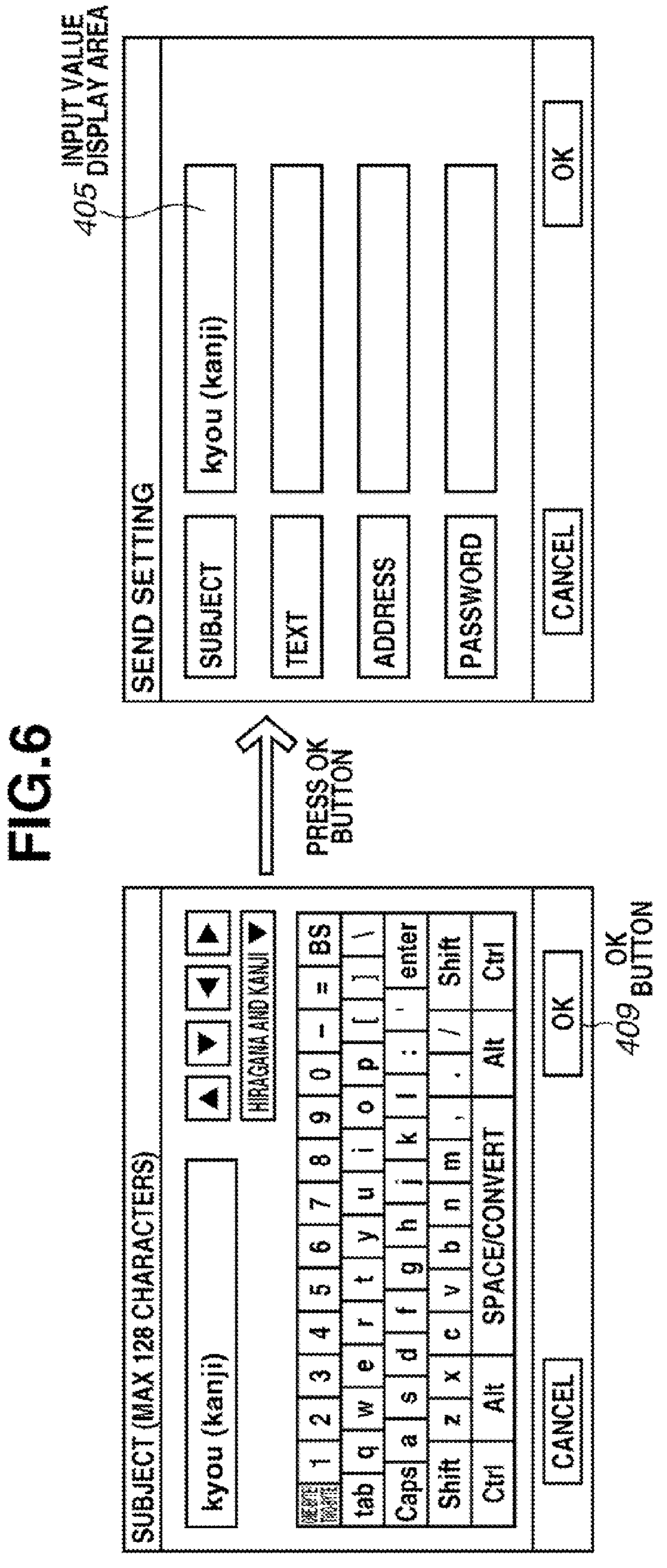
FIG. 6 illustrates an example of a UI displayed on the display unit.

FIG. 5 illustrates a display transition in the input area 407 illustrated in FIG. 4B. FIGS. 6A and 6B illustrate an example of a user interface displayed on the display unit 105 illustrated in FIG. 1. FIGS. 6A and 6B are an example of the screen display resulting from the key input processing with use of the soft keyboard illustrated in FIG. 5.

First, a user presses the soft key indicated as "k" with use of the soft keyboard (hereinafter, such an action will be expressed as "press the "k" soft key", or "input "k"").

Accordingly, the input/output processing unit 103 displays "k" in the input area 407. At this time, "k" is highlighted with a color added to the background of "k", which indicates that "k" is an unfinalized character. The term "unfinalized character" means that a character is in an unfinalized state (in a state still allowing conversion to another character). In the following description, unless otherwise indicated, it is assumed that the content input on the soft keyboard screen is displayed in the input area 407.

After the user presses the "k" soft key in this way, the user further presses the "y" soft key. Accordingly, "ky" is displayed in the input area 407 as unfinalized characters. Further, the user sequentially presses the "o" and "u" soft keys.

As a result, since the current input mode is the "HIRAGANA AND KANJI" mode, "kyou (hiragana)" is displayed in an unfinalized state as the hiragana characters corresponding to "kyou". In this state, the user further presses the "SPACE/CONVERT" soft key to convert the hiragana characters into the kanji characters. As a result, "kyou (kanji)" is displayed as unfinalized characters.

In this state, the user further presses the "ENTER" soft key to finalize unfinalized characters. As a result, "kyou (kanji)" is displayed as finalized characters. When the user presses the OK button 409 on the soft keyboard screen in this state, the CPU 101 closes the soft keyboard screen, and stores the character string "kyou (kanji)" in the RAM of the memory 102 in such a manner that this character string is associated with the calling item 1.

At the same time, the CPU 101 displays the screen showing the calling item 1 on the display unit 105, and displays "kyou (kanji)" in the input value display area 405 corresponding to the calling item 1 (refer to FIG. 6B). One calling item corresponds to one input value display area, and the input value display area 405 corresponding to the calling item 1 illustrated in FIG. 6B is the area next to the calling item 1.

Next, internal processing when a soft key is pressed on the soft keyboard screen will be described with reference to a flowchart illustrated in FIG. 7.

Figure 7:
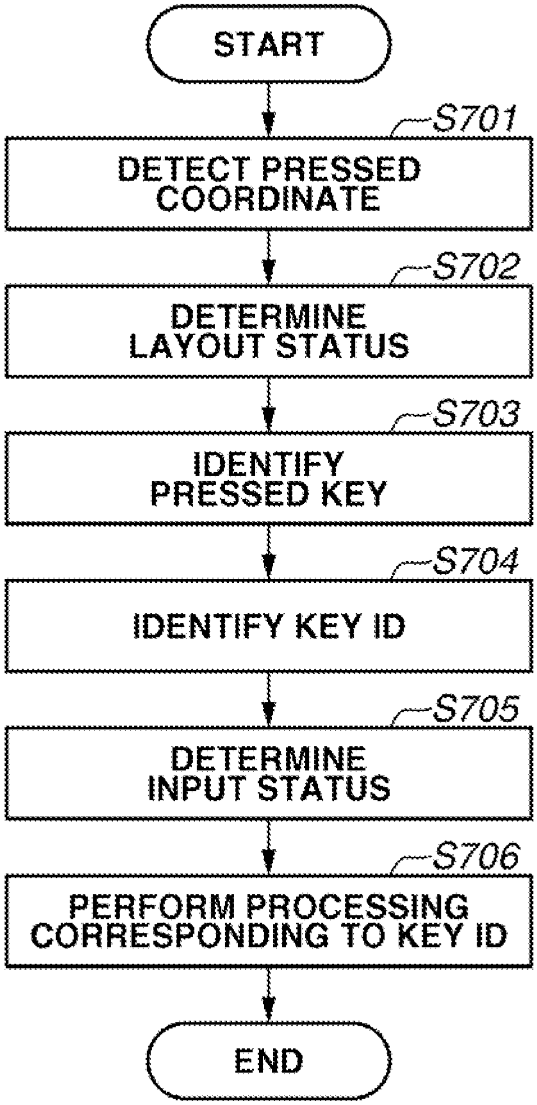
FIG. 7 is a flowchart illustrating a data processing procedure of the image forming apparatus.

FIG. 7 is the flowchart illustrating an example of a data processing procedure of the image forming apparatus according to the present exemplary embodiment. The CPU 101 loads the control programs stored in the memory 102 or the program memory unit 115 onto the memory 102, and executes them, so that each step in the flowchart illustrated in FIG. 7 can be realized. The control programs include the USB keyboard processing unit 108, the input/output processing unit 103, the soft keyboard processing unit 107, the status determination unit 111, the key input processing unit 112, the connection detection unit 113, and the hard key input processing unit 114.

<Internal Processing when Soft Key is Pressed>

When a user presses any soft key on the soft keyboard screen illustrated in FIG. 4, the CPU 101 detects the pressed coordinate that the user presses, and the currently displayed screen information.

Then, in step S701, the CPU 101 executes the input/output processing unit 103 to determine that the currently displayed screen is a screen subject to a determination by the soft keyboard processing unit 107, and to detect the pressed coordinate and the currently displayed screen information.

Next, in step S702, the CPU 101 executes the soft keyboard processing unit 107 to determine a layout status of the current soft keyboard screen by the status determination unit 111 of the soft keyboard processing unit 107. The "layout status" indicates which type of characters to be input in the current status from a plurality of types of characters such as the hiragana characters and alphabets/numbers, and whether characters to be input in capital letters or lower-case letters in the current status. The layout status is determined based on the input mode (such as "HIRAGANA AND KANJI" and "ALPHABET") selected on the soft keyboard screen, and the information about whether the "SHIFT" key is pressed.

After the determination of the layout status, in step S703, the CPU 101 executes the soft keyboard processing unit 107 to identify the pressed soft key based on a "correspondence table containing soft keys corresponding to pressed coordinates and layout statuses" stored in advance in the ROM of the memory 102.

After the CPU 101 identifies the pressed soft key in this way, in step S704, the CPU 101 executes the soft keyboard processing unit 107 to identify a key identification (ID) from a "correspondence table containing key IDs corresponding to soft keys" stored in advance in the ROM of the memory 102.

Then, in step S705, the CPU 101 executes the key input processing unit 112 and the status determination unit 111 to determine the input status of the soft keyboard screen.

The input status of the soft keyboard screen can be determined based on the selected input mode, existence or absence of an unfinalized character in a string displayed in the input area, the maximum number of enterable characters, the maximum number of enterable lines, and the keyboard type.

Next, in step S706, the CPU 101 executes the key input processing unit 112 to determine the input state to identify the processing from a "correspondence table containing processing corresponding to key IDs and input statuses" stored in advance in the ROM of the memory 102, and performs the identified processing.

For example, assuming that the key ID is 97 (when a user presses the "a" soft key), the CPU 101 displays "a" as a finalized character if the input mode is the "ALPHABET" mode, while the CPU 101 displays "a (hiragana)" as an unfinalized character if the input mode is "HIRAGANA AND KANJI". Even in the case where the key ID is 50 and the input mode is "ALPHABET", the CPU 101 displays an error message if a display of the character "a" will cause an excess over the maximum number of characters that can be input on the current soft keyboard screen.

Further, even in the case where the key ID is 50 and the input mode is "ALPHABET", the CPU 101 displays "*" if the keyboard type is the "PASSWORD KEYBOARD" (the CPU 101 displays "*" on the screen but sets "a" as data in the memory 102).

For convenience of description, it is assumed in the present exemplary embodiment that all key IDs are defined in the "correspondence table containing processing corresponding to key IDs and input statuses". Therefore, the CPU 101 necessarily performs some kind of processing based on the key ID (for example, in response to the key ID of a key corresponding to processing that the CPU 101 cannot perform, the CPU 101 displays a message indicating an input error in the input area 407).

In this way, the CPU 101 functions as a first receiving unit which receives an input to a predetermined input item displayed on the display unit 105 via the soft keyboard displayed on the display unit 105. Further, as will be described below, the CPU 101 functions as a second receiving unit which receives an input to a predetermined input item via the USB keyboard as a hardware keyboard connected to the image forming apparatus.

Now, a description will be given of internal processing for reflecting, onto the soft keyboard screen, an input issued through the USB keyboard connected to the image forming apparatus as an example of a hard key input.

<Internal Processing of Input from USB Keyboard>

Figure 8:
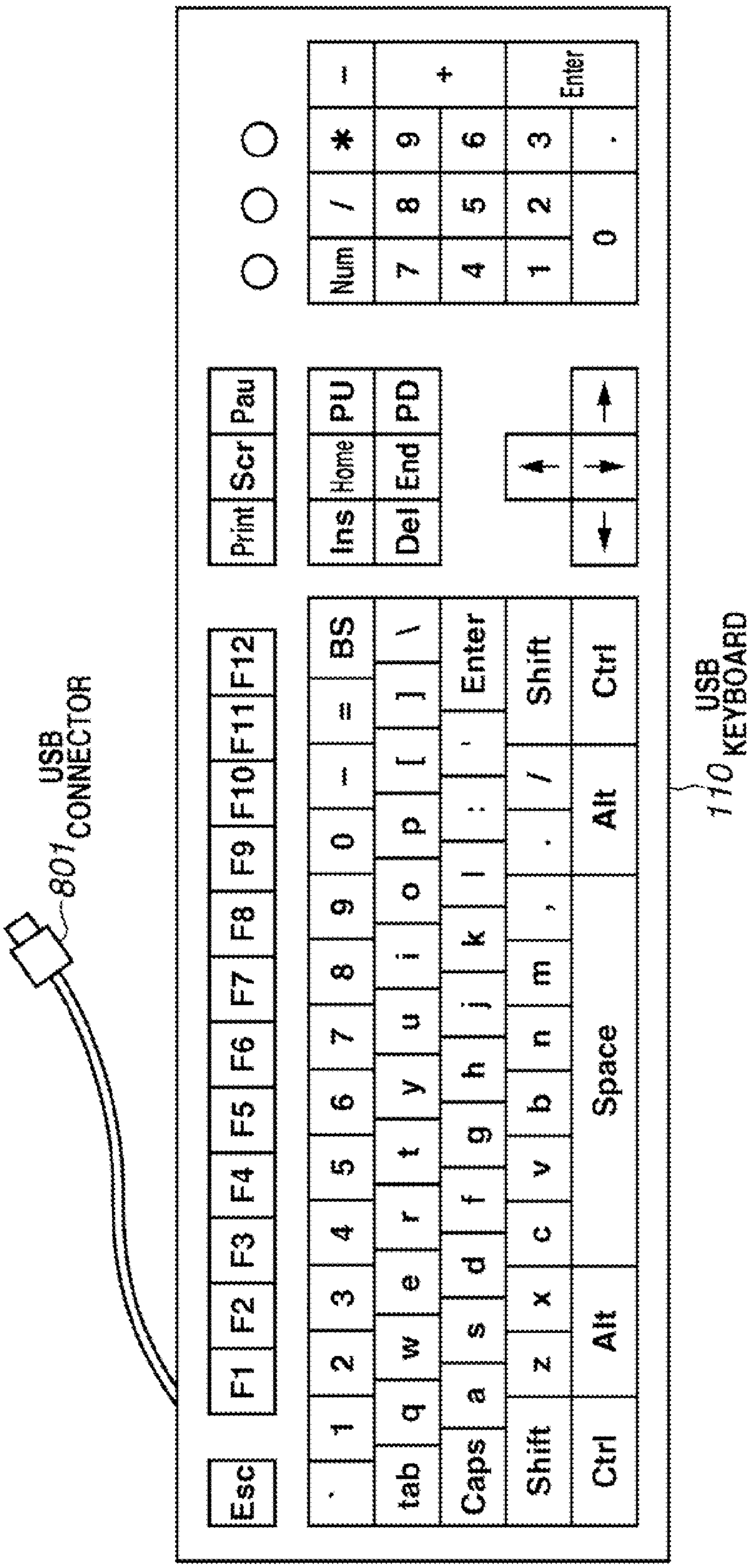
FIG. 8 is a top view illustrating an example of a universal serial bus (USB) keyboard.

FIG. 8 is a top view illustrating an example of the USB keyboard 110 illustrated in FIG. 1. The USB keyboard 110 in the present exemplary embodiment is a generally used keyboard provided with a USB connector 801 for a connection to a USB port of the image forming apparatus, and therefore the description of its internal structure and operation method will be omitted herein.

In the following, processing when the USB keyboard 110 is connected to the image forming apparatus, and processing for acquiring input key information will be described with reference to FIG. 9.

Figure 9:
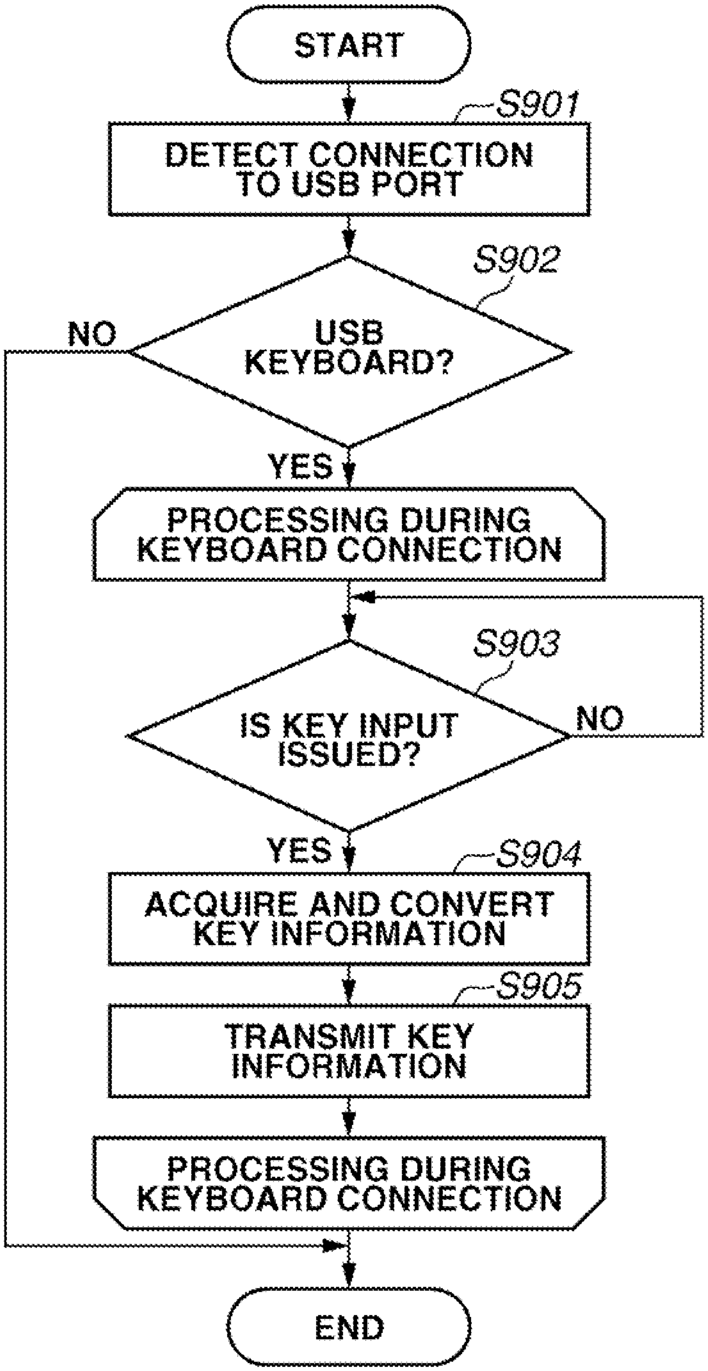
FIG. 9 is a flowchart illustrating a data processing procedure of the image forming apparatus.

FIG. 9 is a flowchart illustrating an example of a data processing procedure of the image forming apparatus according to the present exemplary embodiment. The CPU 101 loads the control programs stored in the program memory unit 115 onto the memory 102, and executes them, so that each step in the flowchart illustrated in FIG. 9 can be realized. The control programs include the USB keyboard processing unit 108, the input/output processing unit 103, the soft keyboard processing unit 107, the status determination unit 111, the key input processing unit 112, the connection detection unit 113, and the hard key input processing unit 114.

A user connects the USB keyboard 110 (to be exact, the USB connector 801 of the USB keyboard 110) to the USB port (not illustrated) of the image forming apparatus. In step S901, upon the connection of the USB keyboard 110, the CPU 101 detects that a device is connected to the USB port by executing the connection detection unit 113. There is a plurality of specific connection detection methods, and in the present example, the CPU 101 detects a device connection by the method of regularly polling and monitoring information from the USB port by executing the connection detection unit 113.

Next, in step S902, after the CPU 101 detects that a device is connected to the USB port, the CPU 101 determines whether the connected device is the USB keyboard 110 by executing the USB keyboard processing unit 108. There is a plurality of specific determination methods for determining whether the device connected to the USB port is the USB keyboard 110. The present example adopts the method in which the CPU 101 generates an event file at a specific position ("/dev/input/directory" of the HDD) in the memory 102 of the image forming apparatus upon a connection of the USB keyboard 110, and the CPU 101 checks the generated event file.

As a result, if the CPU 101 determines that the connected device is the USB keyboard 110 (YES in step S902), the CPU 101 starts processing during a keyboard connection (steps S903 to S905).

On the other hand, if the CPU 101 determines in step S902 that the connected device is not the USB keyboard 110 by executing the USB keyboard processing unit 108 (NO in step S902), the processing is stopped and then is ended.

Next, the processing that is performed during the USB keyboard connection corresponding to steps S903 to S905 will be described. In step S903, if there is no key input from the USB keyboard 110 (NO in step S903), the CPU 101 waits until an issuance of a key input from the USB keyboard 110.

If a key input is issued from the USB keyboard 110 (to be exact, any key on the USB keyboard 110 is pressed) (YES in step S903), in step S904, the CPU 101 acquires a hard key ID from the event file by executing the hard key processing unit 114. After the CPU 101 acquires the hard key ID in this way, the CPU 101 acquires the corresponding key ID from a "correspondence table containing key IDs corresponding to hard key IDs" stored in advance in the memory 102.

In this example, it is assumed that the key ID acquired when the soft key is pressed as described above and the key ID acquired at this time can be the same ID when the key IDs represent the same character. Then, in step S905, similarly to the processing when the soft key is pressed as described above, the CPU 101 determines the status of the soft keyboard screen, and performs processing corresponding to the key ID by the key input processing unit 112. The processing performed by the CPU 101 in step 905 will be described below with reference to FIG. 10.

In this way, the CPU 101 can convert the hard key ID corresponding to the key that the user presses on the USB keyboard into the key ID corresponding to the hard key ID, and perform processing corresponding to the key ID.

Next, processing of closing the soft keyboard screen by a key input from the USB keyboard in the image forming apparatus will be described with reference to FIG. 10.

<Close of Soft Keyboard Screen from USB Keyboard>

Figure 10:
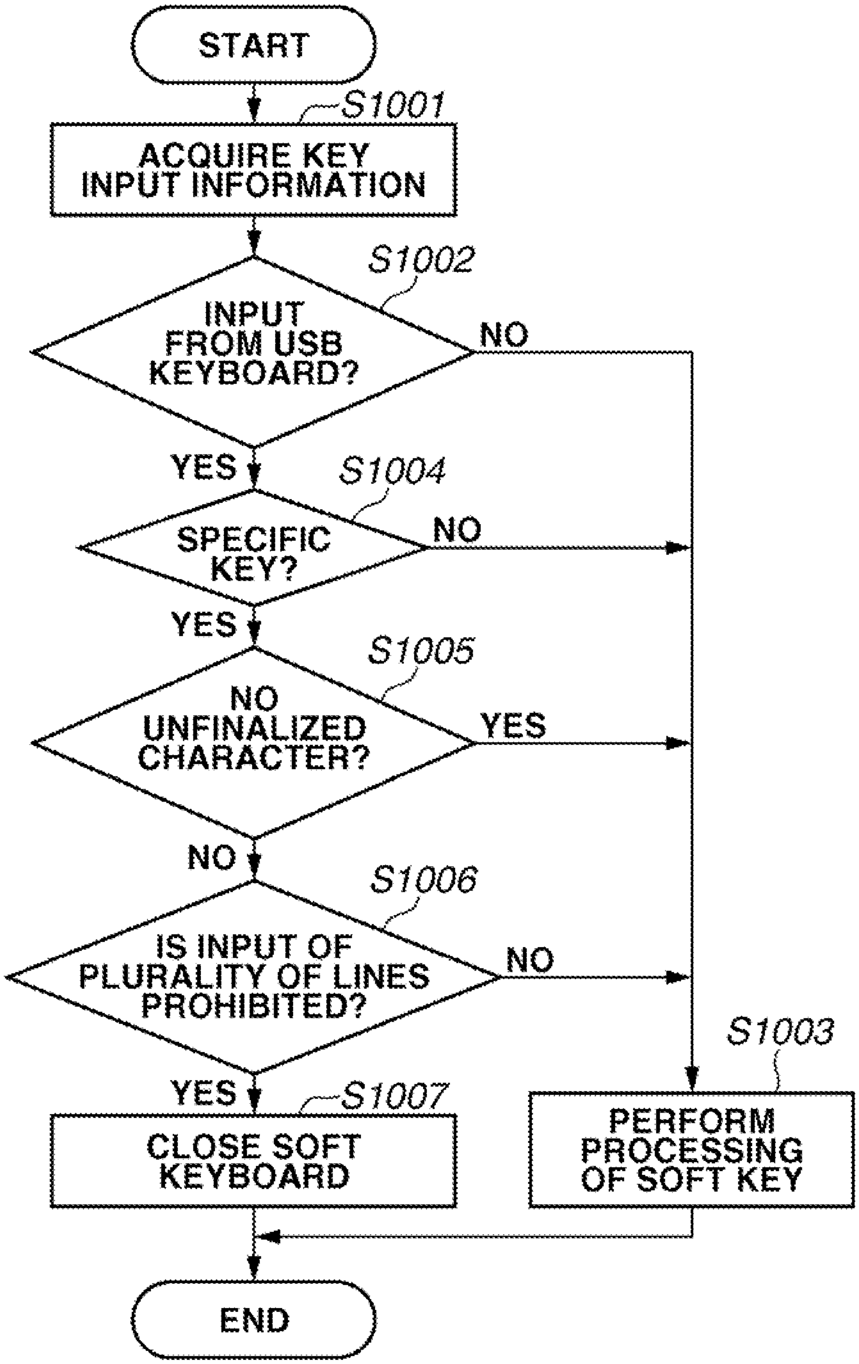
FIG. 10 is a flowchart illustrating a data processing procedure of the image forming apparatus.

FIG. 10 is a flowchart illustrating an example of a data processing procedure in the image forming apparatus according to the present exemplary embodiment. The CPU 101 loads the control programs stored in the program memory unit 115 onto the memory 102, and executes them, so that each step in the flowchart illustrated in FIG. 10 can be realized. The control programs include the USB keyboard processing unit 108, the input/output processing unit 103, the soft keyboard processing unit 107, the status determination unit 111, the key input processing unit 112, the connection detection unit 113, and the hard key input processing unit 114.

In step S1001, when a user performs a key input via the USB keyboard 110, the CPU 101 acquires the key ID corresponding to the input key, and information used for performing processing from step S1002 to step S1006, which will be described below, by executing the key input processing unit 112. Then in step S1002, the CPU 101 determines whether the key input is an input from the USB keyboard 110.

If the CPU 101 determines that the key input is not from the USB keyboard 110 (NO in step S1002), then in step S1003, the CPU 101 processes the key input on the USB keyboard in the same manner as the processing for a normal key input via the soft keyboard, by executing the key input processing unit 112. Then, the processing is ended. The processing performed in step S1003 corresponds to the key ID of a pressed key on the software keyboard. For example, the CPU 101 inputs a character if the pressed key is a character key. Examples of the character include the hiragana characters, the katakana characters, symbols, alphabets, and numbers.

On the other hand, if the CPU 101 determines that the key input is from the USB keyboard 110 (YES in step S1002), then in step S1004, the CPU 101 further determines whether the received key input is a specific key by executing the key input processing unit 112. The "specific key" refers to, for example, an "ENTER" key illustrated in FIG. 8. The ENTER key is just an example, and the specific key may be another key capable of being used for finalizing an input to an input item and beginning a new line regardless of whether the key is called ENTER key.

If the CPU 101 determines that the received key input is not the specific key (NO in step S1004), then in step S1003, the CPU 101 processes the key input on the USB keyboard according to the key ID in the same manner as the processing for a normal key input on the soft keyboard, by executing the key input processing unit 112. The processing performed at this time corresponds to the key ID of the pressed key on the USB keyboard. For example, if the pressed key is a character key, the CPU 101 inputs a character. Examples of the character include the hiragana characters, the katakana characters, symbols, alphabets, and numbers.

On the other hand, if the received key input is the specific key (YES in step S1004), then in step S1005, the key input processing unit 112 further determines whether there is any unfinalized character in the input area 407 on the soft keyboard screen by the status determination unit 111.

If there is any unfinalized character (YES in step S1005), then in step S1003, the CPU 101 processes the key input on the USB keyboard 110 in the same manner as the processing for normal pressing of a key on the soft keyboard by executing the key input processing unit 112. The processing performed at this time is according to pressing of the specific key. For example, if the specific key is the ENTER key, the CPU 101 finalizes an unfinalized character.

On the other hand, if the CPU 101 determines that there is no unfinalized character in the input area 407 (NO in step 1005), then in S1006, the CPU 101 determines whether an input of a plurality of lines is prohibited based on the maximum number of enterable lines from the parameters received during the display of the keyboard screen. The CPU 101 makes the determination by executing the key input processing unit 112 and the status determination unit 111.

If the CPU 101 determines that an input of a plurality of lines is not prohibited (the maximum number of enterable lines is two or more) (NO in step S1006), then in step S1003, the CPU 101 processes the key input on the USB keyboard 110 in the same manner as the processing for normal pressing of a key on the soft keyboard by executing the key input processing unit 112. In this case, since the maximum number of enterable lines is not one but two or more, the CPU 101 inserts a line break according to the pressing of the specific key. At this time, the CPU 101 may display a signal indicating a line break or may not display it.

On the other hand, if the CPU 101 determines in step S1006 that an input of a plurality of lines is prohibited (the maximum number of enterable lines is one) (YES in step S1006), the present processing proceeds to step S1007.

In step S1007, the CPU 101 performs a closing operation of the soft keyboard screen by executing the key input processing unit 112 to convert the key input into the processing performed when a user presses the OK button 409 on the soft keyboard screen. Then, the processing is ended. At this time, the CPU 101 stores the characters input in the input area 407 in the RAM of the memory 102 in such a manner that the characters are associated with the calling item, and then the CPU 101 closes the display of the soft keyboard screen. The CPU 101 displays the characters stored in the RAM of the memory 102 in the area corresponding to the calling item, when the CPU 101 displays the screen including the calling item illustrated in FIG. 4A on the display unit 105. Then, the processing is ended.

According to the above-described processing, the soft keyboard screen can be closed if predetermined conditions (for example, steps S1004 to 1006) are satisfied when a user inputs the "ENTER" key on the USB keyboard.

Specific Example

The processing illustrated in FIG. 10 will be described more concretely based on an example of displaying the soft keyboard screen for the parameter "SUBJECT" illustrated FIG. 3 on the display unit 105, inputting "Kyou ha hare (kanji and hiragana) (i.e., It is fine today)", and then closing the soft keyboard screen.

It is assumed that an initial status of the soft keyboard screen is in the input mode "HIRAGANA AND KANJI", and there is no character input in the input area 407. Further, it is assumed that the ENTER key on the USB keyboard is used as the specific key for closing the soft keyboard (also in other embodiments, the ENTER key is used as the specific key).

First, when a user inputs "k" using the USB keyboard 110 (to be exact, when the user presses a key with the character "k" printed thereon on the USB keyboard), the CPU 101 acquires 37 as the hard key ID corresponding to the "k" key by executing the hard key processing unit 114. Then, the CPU 101 acquires the key ID (a value of the key ID is "107") corresponding to the hard key ID from the memory 102.

In step S1001, the CPU 101 receives the above-described key ID by executing the key input processing unit 112, and then in step S1002, the CPU 101 determines whether the received key ID is an input from the USB keyboard 110. Then, after the CPU 101 determines that the received key ID is an input from the USB keyboard 110, in step S1004, the CPU 101 further determines whether the received key ID is the key ID of the specific key by executing the key input processing unit 112.

The received key ID at this time is "107", and is not "10" that is the key ID of the ENTER key serving as the specific key in the present exemplary embodiment. Therefore, in step S1003, the CPU 101 performs the same processing as the processing when a user presses a soft key on the soft keyboard screen by executing the key input processing unit 112.

In this example, the input mode is "HIRAGANA AND KANJI", and no character is displayed in the input area 407. Therefore, upon the reception of the key ID "107", the CPU 101 displays the character "k" in the input area 407 in an unfinalized state (since the key ID "107" is the same value as the key ID obtained when a user presses the "k" key on the soft keyboard).

Subsequently, when the user inputs the "y" key from the USB keyboard 110, the key input processing unit 112 adds "y" in an unfinalized state to the input area 407 on the soft keyboard screen according to the same processing as the processing for the above-described input of the "k" key. As a result, the status of characters displayed in the input area 407 is changed into "ky".

Subsequently, when the user inputs the "o" key and the "u" key from the USB keyboard 110, the key input processing unit 112 displays "Kyou (hiragana)" in the input area 407 as unfinalized characters according to the same processing as the processing for the above-described input of the "k" key.

When the user further inputs "SPACE/CONVERT" from the USB keyboard 110, the key input processing unit 112 displays "Kyou (kanji)" in the input area 407 as unfinalized characters according to the same processing as the processing for the above-described input of the "k" key.

When the user inputs the "ENTER" key from the USB keyboard 110 in this state, the CPU 101 determines that the pressed key is the specific key in step S1004, unlike the processing for the above-described input of the "k" key. Then, in step S1005, the CPU 101 further determines whether there is any unfinalized character by executing the key input processing unit 112.

Since unfinalized characters "Kyou (kanji)" are displayed at this time, in step S1003, the CPU 101 performs the same processing as the processing for normal pressing of the "ENTER" key on the soft keyboard (the process for finalizing unfinalized characters).

Further, in this state, the user sequentially inputs the "h" key, the "a" key, and the "ENTER" key from the USB keyboard 110. Then, the CPU 101 executes the key input processing unit 112 to display "Kyou ha (kanji and hiragana)" in the input area 407 on the soft keyboard screen in a finalized state according to the same processing as the processing for the above-described key input of the "ENTER" key.

Further, when the user sequentially inputs the "h", "a", "r", "e", and "SPACE/CONVERT" keys from the USB keyboard 110, the key input processing unit 112 displays "Kyou ha hare (kanji and hiragana)" in the input area 407 on the soft keyboard screen according to the same processing as the processing for the above-described input of the "k" key. At this time, "Kyou ha (kanji and hiragara)" is in the finalized state, while "hare (kanji and hiragara)" is in the unfinalized state.

Further, when the user inputs the "ENTER" key from the USB keyboard 110, the CPU 101 executes the key input processing unit 112 to display "Kyou ha hare (kanji and hiragana)" in the input area 407 on the soft keyboard screen in the finalized state according to the same processing as the processing for the above-described input of the "ENTER" key.

When the user further inputs the "ENTER" key from the USB keyboard 110 in this state, the CPU 101 determines that there is no unfinalized character in step S1005, unlike the above-described input of the "ENTER" key. Then, in step S1006, the CPU 101 further determines whether an input of a plurality of lines is prohibited by executing the key input processing unit 112.

In this example, "1" is set as the maximum number of enterable lines which is a parameter passed from the status determination unit 111 when the soft keyboard screen is displayed, and therefore the CPU 101 determines that an input of a plurality of lines is prohibited. Therefore, in step S1007, the CPU 101 performs the processing of closing the soft keyboard screen based on the determination that the key input is an input of the "ENTER" key as the specific key by executing the key input processing unit 112.

At this time, the CPU 101 stores the characters input in the input area 407 in the RAM of the memory 102 in such a manner that the input characters are associated with the calling item, and closes the display of the soft keyboard screen. Then, the CPU 101 displays the characters stored in the RAM of the memory 102 in the area corresponding to the calling item when the CPU 101 displays the screen including the calling item illustrated in FIG. 4A on the display unit 105. Then, the processing is ended.

According to the above-described processing, a user can perform a series of operations from a character input to a close of the soft keyboard screen only by inputs from the USB keyboard 110.

Especially, after the user finishes inputting characters from the USB keyboard 110 while the soft keyboard screen is displayed, the user does not have to be bothered to move his/her hand from the USB keyboard 110 to the operation unit 106 of the image forming apparatus to close the display of the soft keyboard screen.

The present exemplary embodiment converts unfinalized characters to finalized characters word by word when the user inputs "Kyou ha hare (kanji and hiragana)". However, characters may be collectively converted into the finalized state as a whole character string, or may be individually converted into the finalized state character by character (these conversion manners are also possible in other embodiments that will be described below).

Further, in the present exemplary embodiment, all character are input from the USB keyboard 110, but a part of characters or all characters may be input from the soft keyboard (characters may be also input alternatively from the soft keyboard and the USB keyboard, and the same applies to the other embodiments that will be described below).

Further, in the present exemplary embodiment, since the input mode is "HIRAGANA AND KANJI", the unfinalized character is displayed in the input area 407. However, even if the input mode is "ALPHABET" or "FIXED PHRASE" when characters are input, the soft keyboard screen can be closed by an input from the USB keyboard (this is also possible if the input mode is not "ALPHABET", and the same applies to the other embodiments that will be described below).

The present exemplary embodiment converts a key input from the USB keyboard 110 to the same value as the key ID obtained when a key on the soft keyboard is pressed. However, an input from the USB keyboard may be reflected onto the soft keyboard screen by another method such as conversion into a character string (the same applies to the other embodiments that will be described below).

Further, the present exemplary embodiment determines in step S1002 whether a key input is an input from the USB keyboard 110. However, even an input from the soft keyboard can close the soft keyboard screen by performing the processing from step S1004 to step S1007 (the determination in step S1002 may be omitted, and the same applies to the other embodiments that will be described below).

Figure 11:
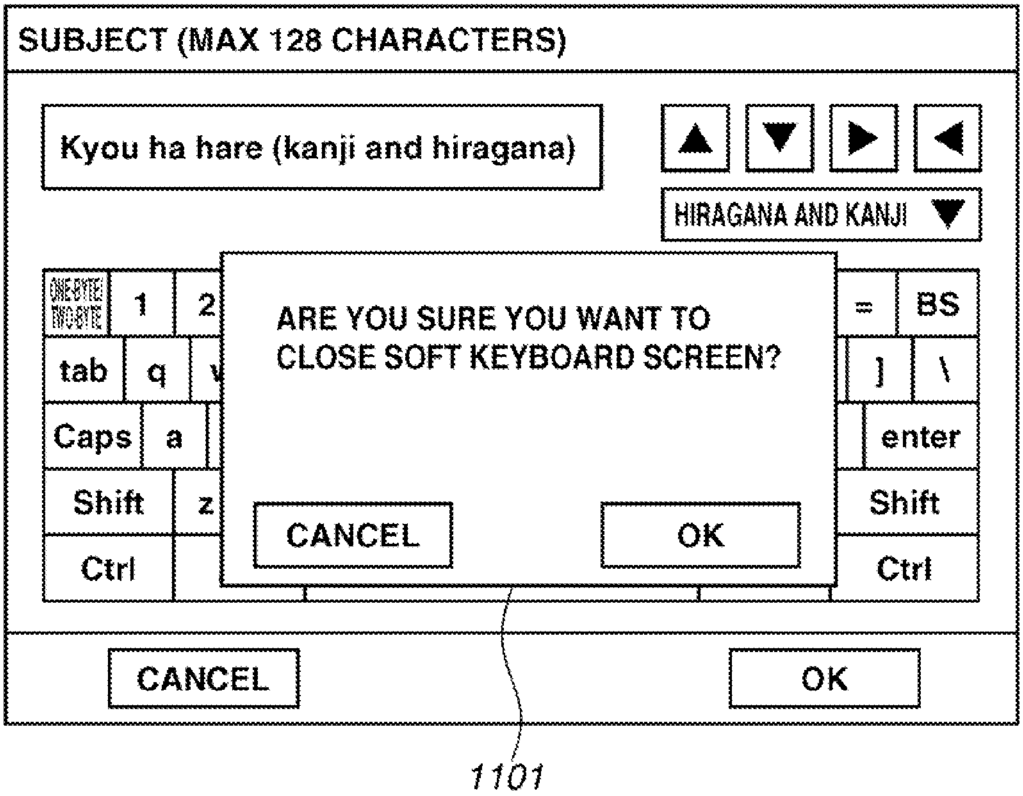
FIG. 11 illustrates an example of a UI displayed on the display unit.

In the present exemplary embodiment, the soft keyboard screen is automatically closed by pressing of the ENTER key from the USB keyboard in step S1007. However, the key input processing unit 112 may display a modal dialog 1101 as illustrated in FIG. 11 on the display unit 105, and allow a user to determine whether to close the soft keyboard screen (the same applies to the other embodiments that will be described below). The "modal dialog" means a dialog box of a type prohibiting user's another operation until the user closes the opened dialog box.

The present exemplary embodiment is described based on an example in which the CPU 101 makes the determinations in steps S1005 and S1006 after the CPU 101 determines that the key input is the specific key in step S1004 regardless of which item of "SUBJECT", "TEXT", "ADDRESS", and "PASSWORD" is input, and then the CPU 101 closes the display of the soft keyboard screen in step S1007 according to the results of the determinations made in steps S1005 and S1006.

However, the present invention is not limited to the above processing flow, and a different processing flow may be performed according an item specified as an input item. More specifically, when "SUBJECT" is specified as an input item, the CPU 101 may perform the processing in step S1007 without making the determination in step S1006 if the CPU 101 determines that there is no unfinalized character in step S1005.

Further, when "ADDRESS" or "PASSWORD" is specified as an input item, the CPU 101 may perform the processing in step S1007 without making the determination in steps S1005 and S1006 when pressing of the specific key is detected in step S1004. Furthermore, when "TEXT" is specified as an input item, the CPU 101 may insert a line break without closing the soft keyboard screen even if the user presses the specific key.

The first exemplary embodiment is described based on an example in which the CPU 101 determines whether to close the soft keyboard screen based on the determination whether an input of a plurality of lines is prohibited as illustrated in step S1006 in FIG. 10.

As a second exemplary embodiment, a description will be given of processing for closing the soft keyboard screen by another determination method different from that in the first exemplary embodiment. Since basic operations and control contents in the second exemplary embodiment are similar to those in the first exemplary embodiment, only differences from the first exemplary embodiment will be described with reference to FIG. 12.

Figure 12:
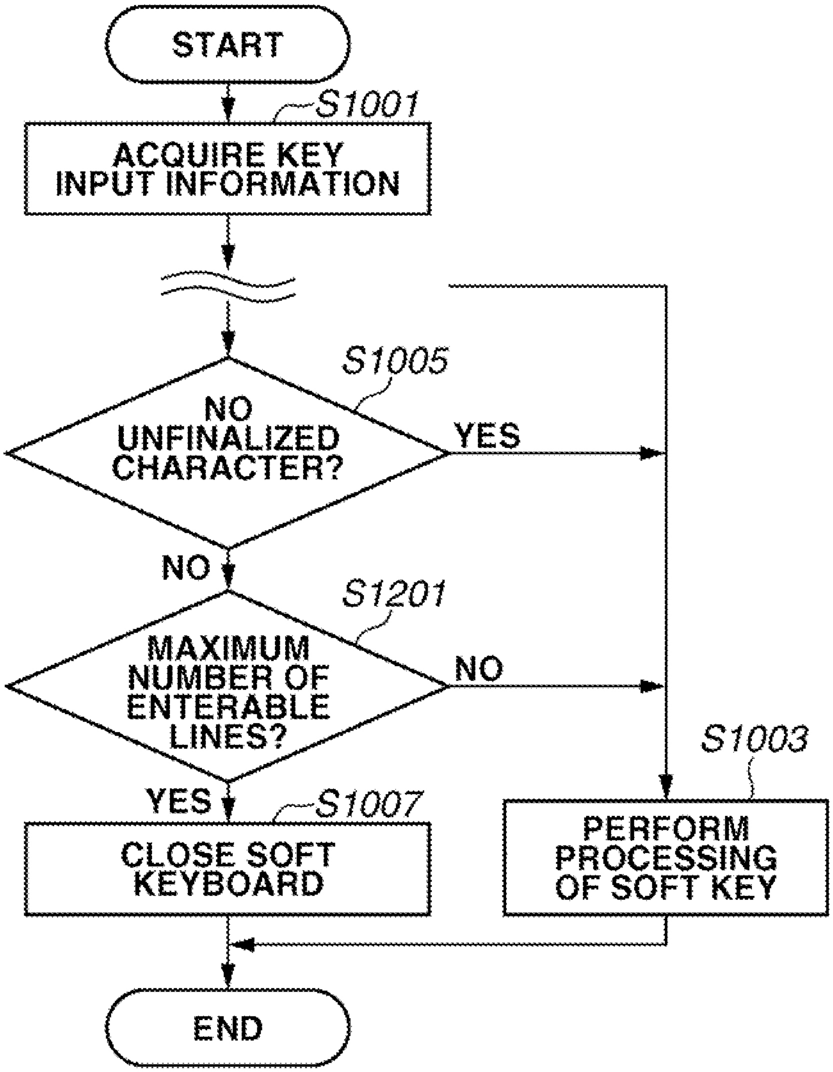
FIG. 12 is a flowchart illustrating a data processing procedure of the image forming apparatus.

FIG. 12 is a flowchart illustrating an example of data processing procedure performed by the image forming apparatus according to the present exemplary embodiment. The present exemplary embodiment is an example of display control for closing the soft keyboard screen if a limit of the number of input lines satisfies a preset condition. The CPU 101 loads the control programs stored in the program memory unit 115 onto the memory 102, and executes them, so that each step in the flowchart illustrated in FIG. 12 can be realized. The control programs include the USB keyboard processing unit 108, the input/output processing unit 103, the soft keyboard processing unit 107, the status determination unit 111, the key input processing unit 112, the connection detection unit 113, and the hard key input processing unit 114.

First, the CPU 101 displays the soft keyboard screen on the display unit 105. Then, a user performs a key input from the USB keyboard 110.

Then, in step S1005, if the key input is an input of the "ENTER" key, and there is no unfinalized character in the input area 407 (NO in step S1005), the processing proceeds to step S1201. In step S1201, the CPU 101 acquires an input line number indicating which line in the input area 407 the user is currently inputting using the status determination unit 111, and determines whether the current input line number is equal to the maximum number of lines.

More specifically, the key input processing unit 112 receives a key ID and a USB keyboard flag from the hard key processing unit 114 via the input/output processing unit 103 and the soft keyboard processing unit 107. Further, the key input processing unit 112 acquires the input line number indicating which line in the input area 407 the user is currently inputting using the status determination unit 111.

Furthermore, the key input processing unit 112 acquires the value of the parameter "MAXIMUM NUMBER OF ENTERABLE LINES" used in the display of the keyboard screen of the calling item which calls the soft keyboard screen currently displayed.

In step S1201, the CPU 101 executes the key input processing unit 112 to compare the current input line number to the value of the maximum number of enterable lines to determine whether the current input line number coincides with the value of the maximum number of enterable lines. If the CPU 101 determines that the current input line number is different from the value of the maximum number of enterable lines (NO in step S1201), in step S1003, the CPU 101 performs the same processing as the processing for a soft key, and the processing is ended. The processing performed in step S1003 corresponds to the key ID of the pressed key on the USB keyboard. For example, if the pressed key is a character key, the CPU 101 inputs a character. Examples of the character include the hiragana characters, the katakana characters, symbols, alphabets, and numbers.

On the other hand, if the CPU 101 determines that the current input line number coincides with the value of the maximum number of enterable lines (YES in step S1201), in step S1007, the CPU 101 closes the soft keyboard by executing the key input processing unit 112, and then the processing is ended. The above processing will be further described with reference to a specific example.

Specific Example

A description will be given of processing of displaying the soft keyboard screen for the parameter "TEXT" illustrated in FIG. 3, and closing the soft keyboard screen by an input from the USB keyboard. It is assumed that an initial status of the soft keyboard screen is in the input mode "HIRAGANA AND KANJI", and there is no character input in the input area 407.

First, when a user inputs an "a" key and the "ENTER" key from the USB keyboard 110, the CPU 101 displays "a (hiragana)" in the input area 407 as the finalized character. Then, the user inputs the "ENTER" key from the USB keyboard 110.

Since this is an input of the specific key from the USB keyboard 110 and there is no unfinalized character in the input area 407, the processing proceeds to step S1201. In step S1201, the CPU 101 determines that the current input is executed in the first line, and "4" is set as the maximum number of enterable lines (NO in step S1201), and then, in step S1003, the CPU 101 performs the processing for the "ENTER" key on the soft keyboard.

The "ENTER" key on the soft keyboard functions to finalize a character if there is an unfinalized character (sets the unfinalized character as the finalized character), and insert a line break if there is no unfinalized character. Therefore, the input of the "ENTER" key on the USB keyboard 110 changes the current input line to the second line. The user can recognize it since the cursor indicating a character input position is moved to the second line.

Subsequently, when the user inputs an "i" key and the "ENTER" key from the USB keyboard 110, the CPU 101 displays "i (hiragana)" on the second line in the input area 407 as the finalized character. Then, the user inputs the "ENTER" key from the USB keyboard 110. Similarly to the previous input of the "ENTER" key, because the current input line number is different from the maximum number of enterable lines in step S1201, the current input line number is changed to the third line.

Subsequently, when the user inputs a "u" key and the "ENTER" key from the USB keyboard 110, the CPU 101 displays "u (hiragana)" on the third line in the input area 407 as the finalized character. Then, the user inputs the "ENTER" key from the USB keyboard 110.

Accordingly, similarly to the previous input of the "ENTER" key, because the current input line number is different from the maximum number of enterable lines in step S1201, the current input line number is changed to the fourth line.

Subsequently, when the user inputs an "e" key and the "ENTER" key from the USB keyboard 110, the CPU 101 displays "e (hiragana)" on the fourth line in the input area 407 as the finalized character.

Then, the user inputs the "ENTER" key from the USB keyboard 110. Unlike the previous input of the "ENTER" key, the current input line number coincides with the maximum number of enterable lines in step S1201 (YES in step S1201). Therefore, if the user further inputs the "ENTER" key on the USB keyboard 110, then in step S1007, the CPU 101 closes the soft keyboard screen. Then, the processing is ended. At this time, the CPU 101 stores the character strings input in the input area 407 in the RAM of the memory 102 as finalized characters, and then closes the soft keyboard screen. The present exemplary embodiment is described based on an example having "4" as the limit number of input lines, but the number can be arbitrarily set by a user.

Accordingly, the CPU 101 can close the soft keyboard screen by an input from the USB keyboard 110 even if the soft keyboard screen allows an input of a plurality of lines. In the present exemplary embodiment, the CPU 101 determines in step S1201 whether the current input line number coincides with the maximum number of enterable lines. However, the CPU 101 can determine whether the current input character number coincides with the maximum number of enterable characters.

Further, the CPU 101 can similarly make a determination with use of, for example, the maximum character length, or the maximum number of characters for each line in the input area 407 on the soft keyboard screen.

Further, in the present exemplary embodiment, the CPU 101 determines in step S1201 whether the current input line number coincides with the maximum number of enterable lines. However, the CPU 101 may count how many times the specific key is pressed consecutively by executing the key input processing unit 112, and close the soft keyboard screen when the number of times that the specific key is pressed becomes equal to or larger than a predetermined number.

The present exemplary embodiment is described based on an example in which the CPU 101 makes the determinations in steps S1005 and S1201 after the CPU 101 determines that the key input is the specific key in step S1004 regardless of which item of "SUBJECT", "TEXT", "ADDRESS", and "PASSWORD" is input, and then the CPU 101 closes the display of the soft keyboard screen in step S1007 according to the results of the determinations made in steps S1005 and S1201.

However, the present invention is not limited to the above processing flow, and a different processing flow may be performed according an item specified as an input item. More specifically, when "SUBJECT" is specified as an input item, the CPU 101 may perform the processing in step S1007 without making the determination in step S1201 if the CPU 101 determines that there is no unfinalized character in step S1005. Further, when "ADDRESS" or "PASSWORD" is specified as an input item, the CPU 101 may perform the processing in step S1007 without making the determination in steps S1005 and S1201 when pressing of the specific key is detected in step S1004.

Further, when "TEXT" is specified as an input item, the CPU 101 may determine whether the current input line number coincides with the value of the maximum number of enterable lines when the specific key is pressed, and then the CPU 101 may close the soft keyboard screen if the current input line number coincides with the value of the maximum number of enterable lines. On the other hand, the CPU 101 may insert a line break without closing the soft keyboard screen if the CPU 101 determines that the current input line number is different from the value of the maximum number of enterable lines.

The first exemplary embodiment is described based on an example in which the CPU 101 determines whether to close the soft keyboard screen based on the determination whether an input of a plurality of lines is prohibited in step S1006. As a third exemplary embodiment, a description will be given of an example for closing the soft keyboard screen by another determination method different from that in step S1006 in the first exemplary embodiment.

Since basic operations and control contents in the third exemplary embodiment are similar to those in the first exemplary embodiment, only differences from the first exemplary embodiment will be described with reference to a flowchart in FIG. 13.

Figure 13:
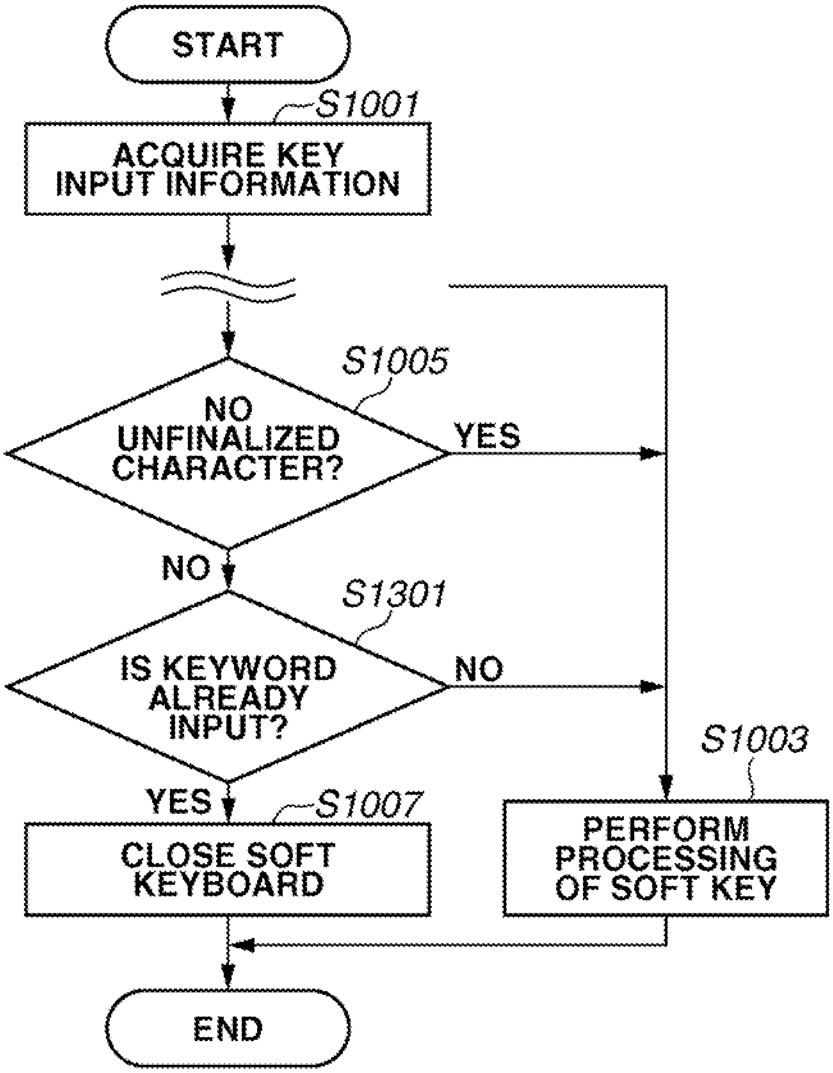
FIG. 13 is a flowchart illustrating a data processing procedure of the image forming apparatus.

FIG. 13 is the flowchart illustrating an example of data processing procedure performed by the image forming apparatus according to the present exemplary embodiment. The present exemplary embodiment is an example of display control for closing the soft keyboard screen if a condition that a character string input by a key operation coincides with a preset keyword character string is satisfied. The CPU 101 loads the control programs stored in the program memory unit 115 onto the memory 102, and executes them, so that each step in the flowchart illustrated in FIG. 13 can be realized. The control programs include the USB keyboard processing unit 108, the input/output processing unit 103, the soft keyboard processing unit 107, the status determination unit 111, the key input processing unit 112, the connection detection unit 113, and the hard key input processing unit 114.

First, the CPU 101 displays the soft keyboard screen on the display unit 105. Then, a user performs a key input from the USB keyboard 110.

In step S1005, if the CPU 101 determines that the key input is the "ENTER" key and there is no unfinalized character in the input area 407 (NO in step S1005), then in step S1301, the CPU 101 determines whether a specific keyword is already input. The determination in step S1301 will be described below.

In step S1301, the CPU 101 acquires the character string displayed in the input area 407 from the RAM of the memory 102 by executing the key input processing unit 112. Then, the CPU 101 determines whether the acquired character string contains a keyword stored in advance in the memory 102 by executing the key input processing unit 112. As a result, if the CPU 101 determines that the keyword is not contained (NO in step S1301), then in step S1003, the CPU 101 performs the same processing as the processing for a soft key. Then, the processing is ended.

On the other hand, if the CPU 101 determines that the keyword is contained (YES in step S1301), then in step S1007, the CPU 101 closes the soft keyboard by executing the key input processing unit 112. Then, the processing is ended. The above processing will be further described with reference to a specific example.

Specific Example

A description will be given of processing of displaying the soft keyboard screen for the parameter "ADDRESS" illustrated in FIG. 3, and closing the soft keyboard screen by an input from the USB keyboard. It is assumed that an initial status of the soft keyboard screen is in the input mode "ALPHABET", and there is no character input in the input area 407. Further, "@vwxyz" is stored in the memory 102 as the specific keyword.

First, when a user inputs a "k" key from the USB keyboard 110, the CPU 101 displays "k" in the input area 407 as the finalized character. Subsequently, the user sequentially inputs "u", "n", "o", "@", "v", "w", "x", and "y" keys from the USB keyboard 110. Accordingly, the CPU 101 displays "kuno@vwxy" in the input area 407 as the finalized characters while storing these characters in the RAM of the memory 102. When the user inputs the "ENTER" key from the USB keyboard 110 in this state, since this is an input of the specific key from the USB keyboard and there is no unfinalized character in the input area 407, the processing proceeds to the determination in step S1301.

In step S1301, the CPU 101 determines whether the character string in the input area 407 contains the keyword "@vwxyz". Since the character string does not contain the keyword (NO in step S1301, the last "z" is not yet input), in step S1003, the CPU 101 performs the same processing as the processing for pressing of a soft key. The present exemplary embodiment is described based on an example having "@vwxyz" as a keyword character string. However, for example, the number of characters can be arbitrarily set by a user.

At this time, since there is no unfinalized character in the input area 407, and the maximum number of enterable lines for the current soft keyboard screen is "1", the CPU 101 outputs an error message indicating that the input is invalid (according to the "correspondence table containing processing corresponding to key IDs and input statuses").

Subsequently, when the user inputs the "z" key from the USB keyboard 110, the CPU 101 displays "kuno@vwxyz" in the input area 407 as the finalized characters. When the user inputs "ENTER" key from the USB keyboard 110 in this state, since this is an input of the specific key from the USB keyboard and there is no unfinalized character in the input area 407, in step S1301, the CPU 101 determines whether the character string contains the keyword. The CPU 101 determines that the character string contains the keyword (YES in step S1301), and then in step S1007, unlike the previous input of the "ENTER" key, the CPU 101 closes the soft keyboard screen, and the processing is ended.

Accordingly, a user can close the soft keyboard screen by an input from the USB keyboard if the user has already input the specific keyword.

In the present exemplary embodiment, if a user inputs a character into an item that is not the "ADDRESS", the soft keyboard screen may not be closed even if the specific keyword is already input and the user inputs the "ENTER" key from the USB keyboard 110.

According to the above-described exemplary embodiments, a user can perform not only a character input on the soft keyboard but also a series of operations from the character input to a close of the soft keyboard screen from the hard keyboard, so that user's operability can be improved.

Further, since a user can use a key of the hard keyboard keys that is used in a character input on the soft keyboard to close the soft keyboard screen, the user can close the soft keyboard screen intuitively.

Aspects of the present invention can also be realized by a computer of a system or apparatus (or devices such as a CPU, micro-processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-108280 filed May 10, 2010, which is hereby incorporated by reference herein in its entirety.

What is claimed is:

1. An image processing apparatus comprising:

a first receiving unit configured to receive a character for an input item via a software keyboard displayed on a display unit;

a second receiving unit configured to receive a character for the input item via a hardware keyboard, the hardware keyboard including a predetermined key for finalizing an unfinalized character; and a control unit configured to control to finalize, in a case where the predetermined key is pressed in a state that the received character includes an unfinalized character, the unfinalized character, and to control to close a display of the software keyboard displayed on the display unit in a case where the predetermined key is pressed in a state that the received character does not include an unfinalized character.

2. The information processing apparatus according to claim 1, wherein the control unit controls to close the display of the software keyboard displayed on the display unit in a case where the received character does not include an unfinalized character and a plurality of lines cannot be input for the input item.

3. The information processing apparatus according to claim 1, further comprising:

a display control unit configured to control the display unit to display a screen for allowing a user to select whether to close the display of the software keyboard displayed on the display unit in a case where the predetermined key is pressed in a state that the received character does not include an unfinalized character, wherein the control unit controls to close the display of the software keyboard displayed on the display unit in a case where the user selects to close the display of the software keyboard via the displayed screen and the predetermined key is pressed in a state that the received character does not include an unfinalized character.

4. The information processing apparatus according to claim 1, wherein the predetermined key is an enter key.

5. A method for controlling an information processing apparatus, the method comprising:

receiving a character for an input item via a software keyboard displayed on a display unit;

receiving a character for the input item via a hardware keyboard, the hardware keyboard including a predetermined key for finalizing an unfinalized character;

controlling to finalize, in a case where the predetermined key is pressed in a state that the received character includes an unfinalized character, the unfinalized character; and controlling to close a display of the software keyboard displayed on the display unit in a case where the predetermined key is pressed in a state that the received character does not include an unfinalized character.

6. A non-transitory computer readable storage medium for storing a computer program for controlling an information processing apparatus, the computer program comprising:

a code to receive a character for an input item via a software keyboard displayed on a display unit;

a code to receive a character for the input item via a hardware keyboard, the hardware keyboard including a predetermined key for finalizing an unfinalized character; and a code to control to finalize, in a case where the predetermined key is pressed in a state that the received character includes an unfinalized character, the unfinalized character, and to control to close a display of the software keyboard displayed on the display unit in a case where the predetermined key is pressed in a state that the received character does not include an unfinalized character.

* * * * *